United States Patent [19]

Hutter

[11] 4,101,783

[45] Jul. 18, 1978

[54] OZONE GENERATOR

[75] Inventor: Felix Jakob Hutter, Altstätten, Switzerland

[73] Assignee: Hutter Apparatebau AG, Altstätten, Switzerland

[21] Appl. No.: 758,766

[22] Filed: Jan. 12, 1977

[30] Foreign Application Priority Data

Jan. 20, 1976 [CH] Switzerland .................. 621/76
Jun. 14, 1976 [CH] Switzerland ................. 7550/76
Dec. 10, 1976 [DE] Fed. Rep. of Germany ....... 2656176

[51] Int. Cl.² .............................. C01B 13/11
[52] U.S. Cl. .................... 250/540; 250/539
[58] Field of Search ................ 250/539, 540

[56] References Cited

U.S. PATENT DOCUMENTS

| | | | |
|---|---|---|---|
| 1,074,462 | 9/1913 | Richards | 250/539 |
| 1,403,025 | 1/1922 | Haase | 250/539 |
| 1,512,285 | 10/1924 | Hartman | 250/540 |
| 1,594,949 | 8/1926 | Hartman | 250/540 |
| 2,308,111 | 1/1943 | Schuette | 250/539 |
| 3,023,155 | 2/1962 | Castor | 250/539 |

Primary Examiner—Richard E. Schafer
Assistant Examiner—Deborah L. Kyle
Attorney, Agent, or Firm—Peter K. Kontler

[57] ABSTRACT

A concentric-tube type ozone generator wherein the lower end portion of the interior of the tube contains a supply of oil which contacts the inner side of the inner tube wall above the inner electrode to prevent the flow of creep currents between the inner and outer electrodes. A second supply of oil can be confined in the upper end portion of the inner tube wall above the inner electrode. The inner electrode may consist of a metallic foil which is biased against the inner side of the inner tube wall by a helical spring. The outer electrode may constitute a helically convoluted metallic wire. Two or more tubes can be mounted above each other with the outlet at the lower end of the upper tube in communication with the inlet at the upper end of the lower tube.

21 Claims, 5 Drawing Figures

OZONE GENERATOR

BACKGROUND OF THE INVENTION

The present invention relates to apparatus (known as ozone generators) for enriching air or another oxygen-containing gas with ozone. More particularly, the invention relates to improvements in ozone generators of the concentric-tube or twin-tube type wherein the inner and outer walls of the tube define an annular chamber through which the oxygen-containing gas flows between a first electrode which is applied to the outer side of the outer wall and a second electrode which is applied to the inner side of the inner wall of the tube.

Presently known ozone generators of the twin-tube type failed to gain widespread acceptance because they are too complex and too expensive. Furthermore, known ozone generators of the just outlined character are not sufficiently safe for use by unskilled or careless persons and/or in areas which are contaminated with dust or other foreign matter. For example, depositions of dust on the walls of a twin-tube type ozone generator can entail the flow of creep currents along the shortest path between the inner and outer electrodes; this can result in a short circuit, severe damage to the source of high voltage which is applied across the electrodes when the ozone generator is in use, and danger or injury to the person or persons nearby.

OBJECTS AND SUMMARY OF THE INVENTION

An object of the invention is to provide a novel and improved apparatus which can be used to enrich air or another oxygen-containing gas with ozone and which is simpler, safer and more reliable than heretofore known apparatus.

Another object of the invention is to provide a twin-tube type ozone generator with novel and improved means for preventing or reducing the likelihood of short-circuiting, even if the generator is used in contaminated areas or is not cleaned for extensive periods of time.

A further object of the invention is to provide novel and improved electrodes for use in an ozone generator.

An additional object of the invention is to provide an ozone generator wherein one or both electrodes can be rapidly and conveniently removed, reinstalled or replaced with little loss in time.

An ancillary object of the invention is to provide the ozone generator with novel and improved means for promoting cooling of the tube as well as with novel and improved means for promoting the flow of oxygen-containing gas through the space between the electrodes.

A further object of the invention is to provide an apparatus which can be readily dismantled to facilitate inspection, cleaning and/or repair.

An additional object of the invention is to provide an apparatus which requires a minimum of maintenance.

One feature of the invention resides in the provision of an apparatus for enriching air or another oxygen-containing gas with ozone which comprises a preferably upright twin-walled tube consisting of glass or another suitable dielectric material and defining an annular chamber with an inlet for admission of oxygen-containing gas at the upper end and an outlet for enriched gas at the lower end of the tube, a first electrode which overlies the inner side of the tube and may constitute an aluminum foil which is biased against the inner side by a helical spring, a second electrode which overlies the outer side of the tube opposite the first electrode and may constitute a helically wound metallic wire, and means for confining a supply of liquid insulating medium (e.g., oil) in the interior of the tube so that the liquid medium contacts the inner side and prevents the flow of creep currents between the electrodes in response to the application of high voltage across the electrodes.

Two or more tubes can be connected in series, preferably one above the other, with the outlet of the upper tube connected to the inlet of the tube therebelow.

The apparatus may further comprise second confining means for a supply of liquid insulating medium; the two confining means are then preferably disposed at the opposite ends of the tube and each thereof preferably defines a passage which permits air or another coolant to flow through the interior of the tube. Each confining means may be integral with, bonded to or separably inserted into or fastened to the tube.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
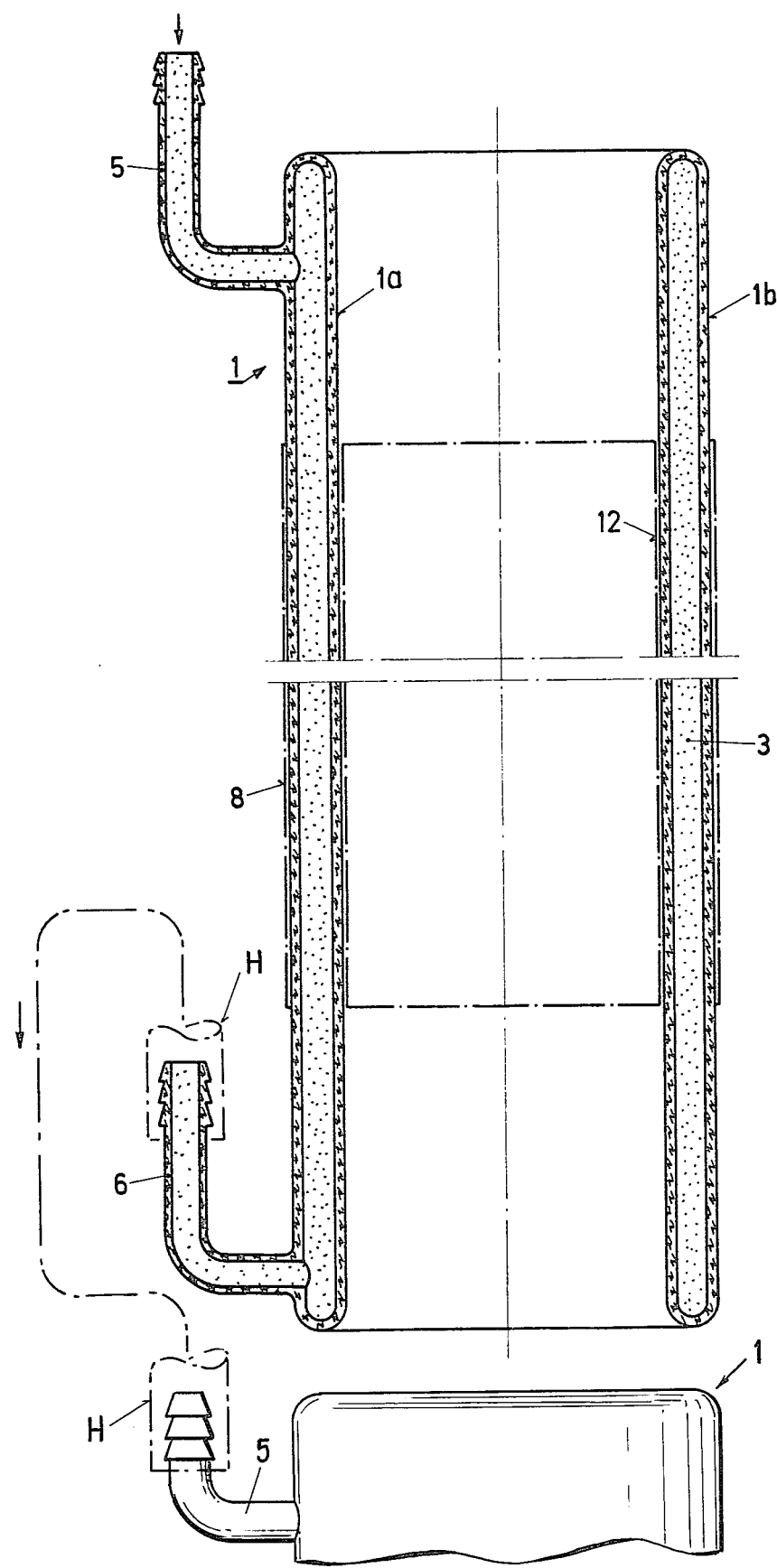
FIG. 1 is a fragmentary axial sectional view of a first apparatus.

Referring first to FIG. 1, there is shown an apparatus (hereinafter called ozone generator or generator) which comprises several twin-walled upright glass tubes 1 which may but need not be of identical size and/or shape. Each tube 1 has an inner wall 1a, an outer wall 1b, an inlet 5 (here shown as an L-shaped nipple) which admits air or another oxygen-containing gas into an annular chamber 3 between the walls 1a, 1b, and an outlet 6 (here shown as an L-shaped nipple) which serves for evacuation of enriched gas from the chamber 3. A first electrode 12 (indicated by phantom lines) overlies the median portion of the inner side of the inner wall 1a, and a second electrode 8 (also indicated by phantom lines) overlies the median portion of the outer side of the outer wall 1b opposite the electrode 12. A hose H or an analogous conduit (indicated by phantom lines) connects the outlet 6 at the lower end of the upper tube 1 with the inlet 5 at the upper end of the lower tube 1. Thus, the enriched gas which issues from the upper chamber 3 and flows through the hose H is enriched again during passage through the chamber 3 of the lower tube 1. Three or more tubes 1 can be disposed one above the other or in another suitable distribution.

Each of the electrodes 8 and 12 may constitute a metallic (e.g., aluminum) foil, a layer of electrically conducting synthetic plastic paint, or a thin layer of metal which is deposited onto the respective side of the tube in vaporized state. Any one of a large variety of metals can be used.

The inner electrode 12 preferably constitutes the anode and the outer electrode 8 preferably constitutes the cathode. When the generator is in use, a high voltage (e.g., 20kV) is applied across the electrodes (the energy source is not shown in the drawing) which causes electric arcs to pass between the electrodes (through the chamber portion between 8 and 12) with the result that the apparatus generates ozone. Since the ozone is heavier than air, the enriched gas flows downwardly and issues from the chamber 3 via outlet 6.

The width of the chamber 3 is preferably in the range of a few millimeters (e.g., 5 millimeters). If and when necessary, the surfaces bounding the chamber 3 can be cleaned by flushing the tube 1 with a suitable solvent which does not contact and therefore cannot mechanically or chemically influence the electrodes 8 and 12. It is preferred to dimension the walls 1a, 1b of each tube 1 in such a way that the generator can be operated at superatmospheric or subatmospheric pressure. As a rule, the inflow of air via each inlet 5 which is open to the atmosphere takes place automatically because the enriched gas is heavier than air and the outflowing gas induces an air flow into the respective chamber 3. Eventual accumulations of moisture in the chambers 3 can be expelled by blowing compressed air into the chambers via inlets 5 or by reducing the pressure in the outlets 6 to below atmospheric pressure.

Figure 2:
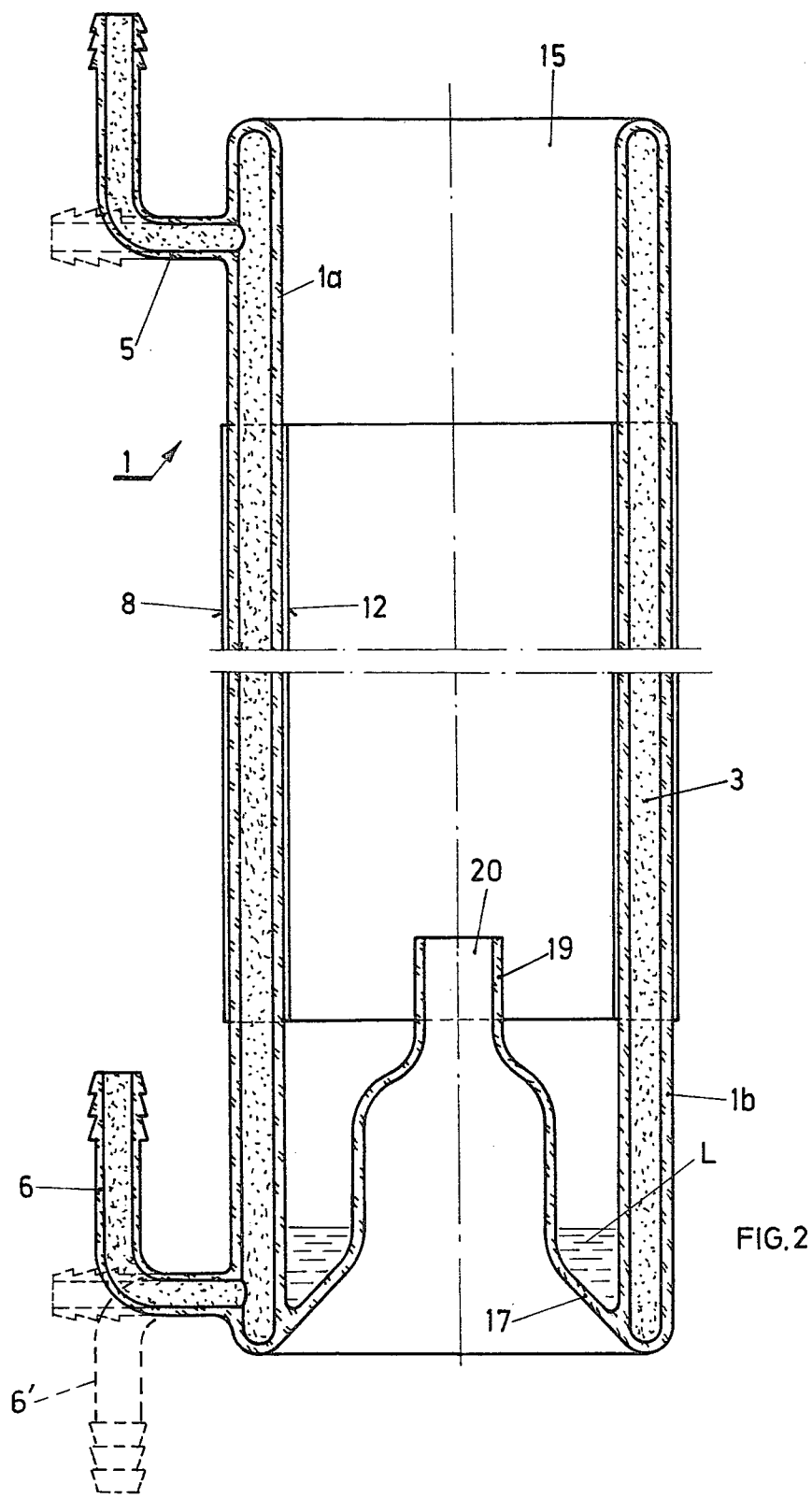
FIG. 2 is a similar sectional view of a second apparatus.

In each of FIGS. 2 to 5, all such parts which are identical with or clearly analogous to corresponding parts of the generator shown in FIG. 1 are denoted by similar reference characters. The generator of FIG. 2 further comprises a bell-shaped tubular member 17 which constitutes a means for confining a ring-shaped supply of liquid insulating medium L (e.g., oil) in contact with the inner side of the inner wall 1a close to the lower end of the tube 1. The open larger-diameter lower end of the member 17 communicates with the atmosphere, and the smaller-diameter upper end portion 19 of the member 17 defines an opening 20 for the passage of a stream of air or another fluid coolant through the interior 15 of the tube 1. It will be noted that the end portion 19 extends to and slightly above the lower ends of the electrodes 8 and 12 and that the liquid medium L contacts that portion of the inner side of the wall 1a which is not overlapped by the respective electrode 12, i.e., this electrode is remote from the lower end of the tube which latter is integral with the larger-diameter lower end portion of the member 17. The axis of the upper end portion 19 preferably coincides with the axis of the tube 1. In the generator of FIG. 2, the dielectric material (preferably glass) of the member 17 is the same as that of the walls 1a and 1b.

When the liquid medium L is to be introduced into or replenished in the interior 15 of the tube 1, such medium is poured into the open upper end of the inner wall 1a. The surplus of introduced medium simply overflows into the opening 20 of the upper end portion 19 of the member 17 and issues through the open lower end of this member. The medium L prevents creep currents from flowing between the lower ends of the electrodes 8 and 12 when a high voltage is applied while the generator is in actual use. The opening 20 is preferably large enough to allow for circulation of large quantities of air or another coolant through the interior 15 of the tube 1. As a rule, the coolant will enter the tube at the upper end.

Figure 3:
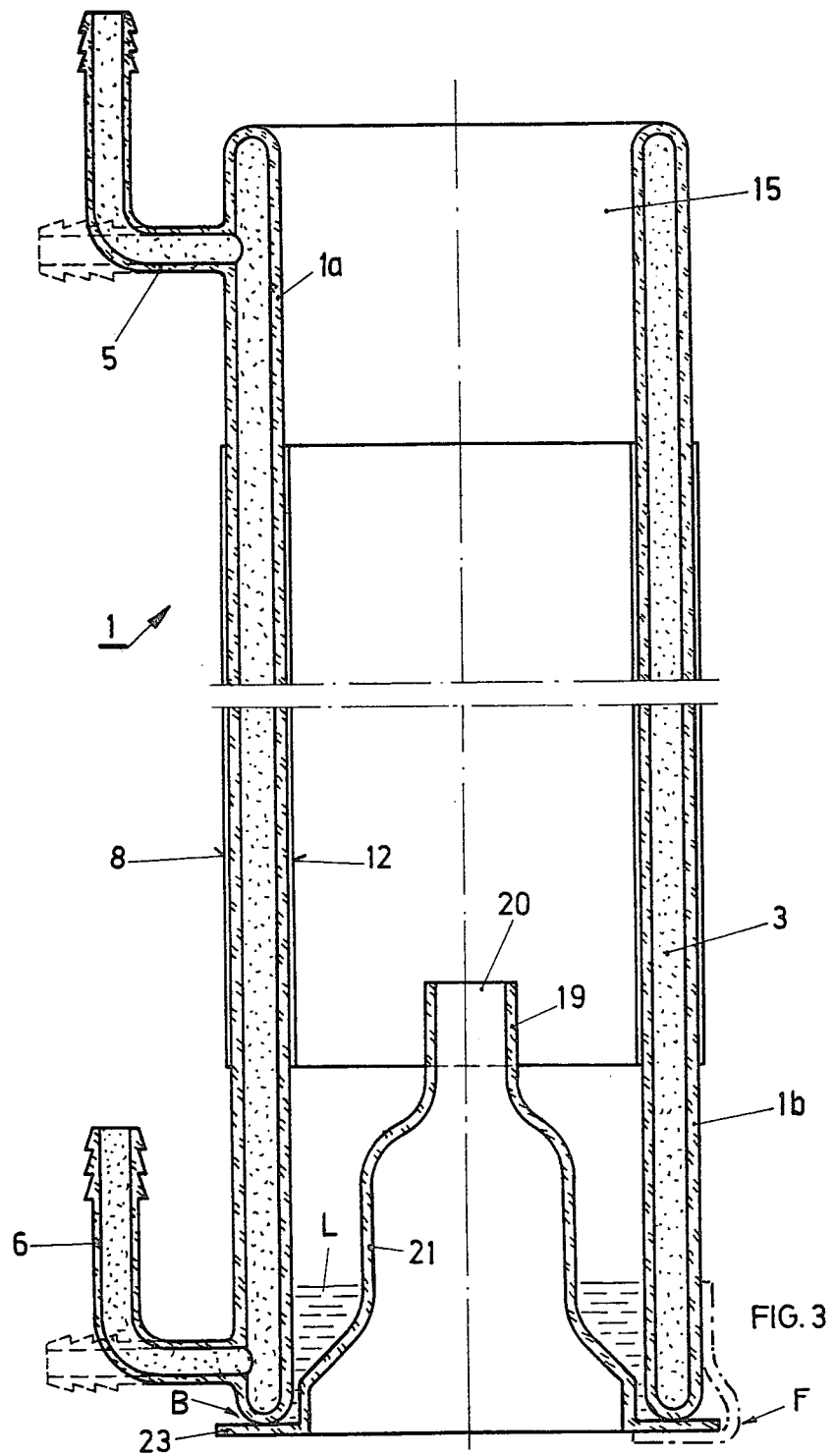
FIG. 3 is a fragmentary axial sectional view of an apparatus which constitutes a first modification of the apparatus shown in FIG. 2.

FIG. 3 illustrates a modification of the generator of FIG. 2. The confining member 21 resembles the member 17 of FIG. 2 but is a discrete part whose flange 23 abuts the lower end of the tube 1 and is bonded to the tube by an adhesive, by putty or in any other suitable way to insure that the supply of liquid insulating medium L cannot escape from the annular space between the lower end of the inner side of the inner wall 1a and the external surface of the member 21. The bonding agent is applied at B.

If desired, the bonding agent B can be used in addition to or as a substitute for one or more fastening devices (one of which is shown by phantom lines, as at F) which establish a readily separable connection between the tube 1 and the member 21. The member 21 is preferably made of a dielectric material which may but need not be identical with the material of the wall 1a and/or 1b. An advantage of the fastening device or devices F is that the member 21 can be readily detached prior to cleaning of the internal surface of the wall 1a. The configuration and function of the upper end portion 19 of the member 21 are preferably identical with those of the similarly numbered end portion of the member 17 of FIG. 2, i.e., the opening 20 allows a coolant to circulate through the interior 15 of the tube 1 and allows surplus liquid insulating medium L to overflow from the space around the member 21.

It is evident that the improved generator may comprise a tube which is provided with liquid confining means at each of its ends. Furthermore, each of the members 17, 21 may be replaced by a confining means which does not provide a passage for the flow of coolant therethrough. If the confining means at the lower end of the tube 1 does not have a through hole, the upper end of the tube should be at least partially open, or openable, to allow for introduction of liquid insulating medium. Moreover, the partly or fully open upper end of such modified tube allows atmospheric air or another coolant to enter the interior 15 when the generator is in use.

Figure 4:
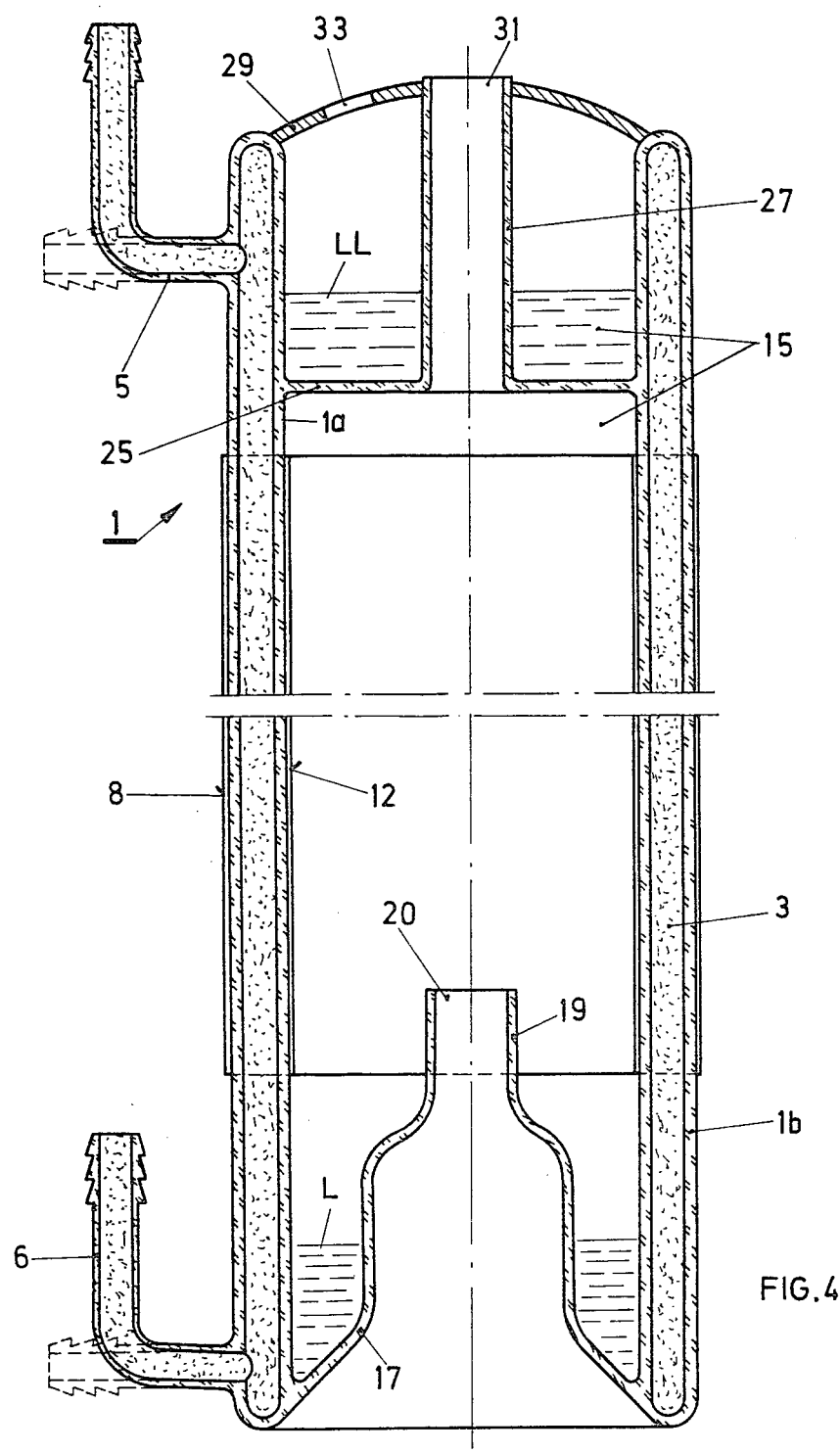
FIG. 4 is a fragmentary axial sectional view of an apparatus with two confining means.

FIG. 4 shows a generator wherein the lower end of the tube 1 is integral with a member 17 which is identical with the similarly referenced member of FIG. 2. A second confining means is provided in the interior 15 of the tube 1 at a level above the upper ends of the electrodes 8 and 12. This second confining means comprises a transverse partition 25 which is integral with the inner wall 1a and divides the interior 15 into an upper compartment receiving a second supply of liquid insulating medium LL and a lower compartment which is surrounded by the electrode 12 and communicates with the interior of the member 17. The upper or second confining means further comprises a pipe 27 which is integral with the partition 25 and is open at both ends. The aperture 31 at the upper end of the pipe 27 admits air or another coolant into the lower compartment of the tube 1, and such coolant issues from the tube by flowing through the passage of the member 17. The medium LL forms a ring around the lower portion of the pipe 27 above the partition 25 and contacts the adjacent portion of the inner side of the wall 1a.

A preferably detachable cover or lid 29 overlies the upper end of the tube 1 and has a central opening for the pipe 27 as well as one or more additional openings 33 for admission of liquid medium LL into the upper compartment. The medium L is admitted through the pipe 27. The cover or lid 29 prevents or reduces the likelihood of splashing of the medium LL if the tube 1 is tilted or agitated.

Figure 5:
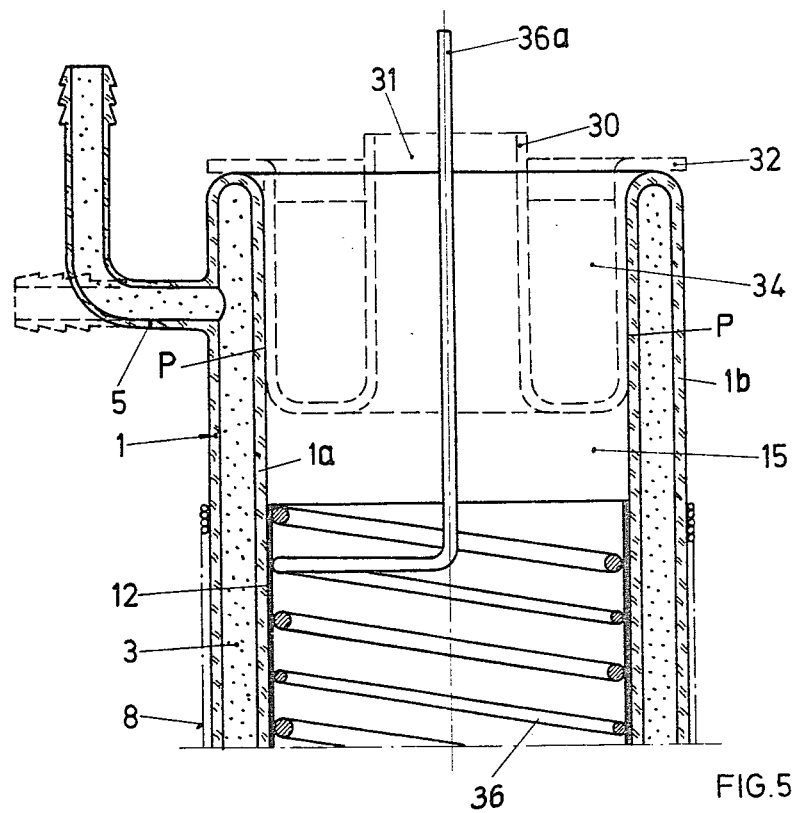
FIG. 5 is an axial sectional view of a portion of a further apparatus.

FIG. 5 shows a portion of a further generator wherein the upper end portion of the tube 1 receives an annular through-shaped partition 30 (indicated by broken lines) having a circumferentially complete or interrupted upper portion or collar 32 which overlies the upper end of the tube. The annular compartment 34 of the partition 30 surrounds a centrally located pipe having an aperture 31 for admission of air or another coolant into the interior 15 of the tube at a level below the partition. The compartment 34 may receive a liquid insulating medium or a supply of liquid coolant.
To insure that the liquid in the compartment 34 will act as an insulating medium, the compartment 34 is sealingly secured to the wall 1a by an insulating material, e.g., a paraffin layer shown at P.

The generator of FIG. 5 exhibits the advantage that the partition need not be made integral with the inner wall 1a. This contributes to lower cost of the tube.

FIG. 5 further shows that the electrode 8 may constitute a helically wound metallic wire (e.g., aluminum wire) which surrounds the outer side of the wall 1b and is connected to one pole of the high voltage source by a suitable clip or clamp, not shown. The inner electrode 12 is a thin metallic foil (e.g., aluminum foil) which is biased against the inner side of the wall 1a by the convolutions of a helical metallic spring 36 which tends to increase its diameter and thereby maintains the foil 12 in contact with the wall 1a. One end portion 36a of the spring 36 (which may consist of chromium nickel steel) extends upwardly through the central passage of the partition 30 and is connectable to the corresponding pole of the aforementioned high voltage source. The spring 36 prevents the formation of air gaps between the inner side of the tube 1 and the electrode 12; such air gaps could cause undesirable discharges when the electrodes 8 and 12 are connected with the high voltage source.

An advantage of electrodes which are shown in FIG. 5 is that each thereof can be readily removed and replaced with a fresh electrode. Moreover, the manufacturing cost and the cost of mounting such electrodes is less than the cost which is involved for deposition of metallic films at the inner and outer sides of the tube 1.

Each of FIGS. 1 to 5 shows (by solid lines) that the inlets 5 and outlets 6 may constitute nipples portions of which extend upwardly. However, and as shown by broken lines in each of FIGS. 2 to 5, the upper and/or the lower nipple may constitute a horizontal pipe. Furthermore, at least a portion of each of the nipples 6 may be inclined downwardly to further enhance the outflow of enriched gas from the respective chamber 3 (see the nipple 6' of FIG. 2).

The improved generator is susceptible of many additional modifications without departing from the spirit of the invention. For example, the generator of FIG. 4 may utilize a separable confining member 21 of the type shown in FIG. 3 and/or a trough-shaped separable partition 30 of the type shown in FIG. 5. Furthermore, each of the generators shown in FIGS. 1 to 4 may comprise an outer electrode and/or an inner electrode of the type shown in FIG. 5. Still further, each of the generators shown in FIGS. 2 to 5 can be connected in series with one or more similar generators or with the generator of FIG. 1.

The height of the column of liquid insulating medium L and/or LL may be varied within a wide range. It is preferred to use relatively high columns of such medium in order to further reduce the likelihood of development of creep currents. Thus, each column may extend close to the respective end of the inner electrode 12. As a rule, the liquid medium (preferably oil) will cover the major part of the inner side of the respective tube above and/or below the electrode 12.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:
1. Apparatus for enriching an oxygen-containing gas with ozone, comprising a one-piece twin-walled tube consisting of dielectric material and having an inner side and an outer side, said tube defining an annular chamber and further having an inlet for admission of oxygen-containing gas into and an outlet for evacuation of enriched gas from said chamber; a first electrode adjacent to said inner side; a second electrode adjacent to said outer side opposite said first electrode, at least one of said electrodes leaving exposed at least one substantially annular portion of the respective side; and means for confining a supply of liquid insulating medium in contact with said exposed portion of said last mentioned side to prevent the flow of creep currents between said electrodes during application of high voltage across said electrodes.

2. Apparatus as defined in claim 1, wherein said tube has a first end and a second end and said first electrode is remote from said first end, said confining means being located in the region of said first end.

3. Apparatus as defined in claim 2, wherein said tube has an inner wall and an outer wall and said confining means contacts said inner wall in the region of said first end.

4. Apparatus as defined in claim 3, wherein said confining means defines a passage which permits the circulation of a fluid coolant through the interior of said tube.

5. Apparatus as defined in claim 4, wherein said confining means comprises a tubular member having a first open end contacting said inner wall at the first end of said tube and a second open end, said first electrode having an end disposed at the general level of said second open end of said tubular member.

6. Apparatus as defined in claim 5, wherein said tubular member is bell-shaped and the diameter of said second open end is smaller than the diameter of said first open end.

7. Apparatus as defined in claim 3, wherein said confining means consists of said dielectric material and is integral with said first end of said tube.

8. Apparatus as defined in claim 3, further comprising means for bonding said confining means to the first end of said tube.

9. Apparatus as defined in claim 3, further comprising means for separably fastening said confining means to the first end of said tube.

10. Apparatus as defined in claim 1, further comprising means for dividing the interior of said tube into a plurality of compartments.

11. Apparatus as defined in claim 1, wherein said tube has a first end and a second end and said first electrode is remote from said ends, said confining means being located in the region of said first end and further comprising second confining means arranged to confine a supply of liquid insulating medium in the interior of said tube in the region of said second end.

12. Apparatus as defined in claim 11, wherein said second confining means confines a supply of liquid insulating medium in the interior of said tube so that the medium in said second confining means contacts a portion of said inner side at said second end of said tube.

13. Apparatus as defined in claim 11, wherein said second confining means comprises a partition extending transversely of said tube and spaced apart from said second end, said partition dividing the interior of said tube into a first compartment adjacent said second end of said tube and a second compartment which is surrounded by said first electrode.

14. Apparatus as defined in claim 13, wherein said second confining means further comprises a pipe rigid with said partition, disposed in said first compartment and defining a path for the flow of a gaseous coolant between the exterior of said tube and said second compartment as well as for admission of liquid medium into said first mentioned confining means.

15. Apparatus as defined in claim 13, further comprising cover means overlying said first compartment.

16. Apparatus as defined in claim 14, further comprising cover means overlying said first compartment, said cover means having an aperture for said pipe and at least one opening for admission of liquid medium into said first compartment.

17. Apparatus as defined in claim 1, wherein said medium is oil.

18. Apparatus as defined in claim 1, wherein said dielectric material is glass and said electrodes constitute thin metallic films at the respective sides of said tube.

19. Apparatus as defined in claim 1, wherein said tube has a first and a second end and said inlet and said outlet are respectively adjacent said first and second ends, said outlet including a pipe at least a portion of which is inclined with respect to the axis of said tube to promote the outflow of enriched gas from said chamber.

20. Apparatus as defined in claim 11, wherein said second confining means comprises an annular trough-shaped partition separably received in said tube adjacent said second end.

21. Apparatus as defined in claim 20, wherein said partition comprises a bottom portion remote from said second end and a second portion which overlies said second end.

* * * * *